United States Patent [19]
Nawa et al.

[11] Patent Number: 5,207,473
[45] Date of Patent: May 4, 1993

[54] VEHICLE SEAT SLIDING DEVICE

[75] Inventors: Hiroshi Nawa, Kariya; Sadao Ito, Anjo, both of Japan

[73] Assignee: Aisin Seiki Kabushiki Kaisha, Japan

[21] Appl. No.: 854,026

[22] Filed: Mar. 19, 1992

[30] Foreign Application Priority Data

Mar. 20, 1991 [JP] Japan .................................. 3-57244

[51] Int. Cl.$^5$ ............................................. B60N 2/02
[52] U.S. Cl. .................................... 296/65.1; 248/430
[58] Field of Search ...................... 248/430, 429, 424; 296/65.1

[56] References Cited

U.S. PATENT DOCUMENTS

| | | | |
|---|---|---|---|
| 4,909,469 | 3/1990 | Nihei et al. | 296/65.1 X |
| 4,957,267 | 9/1990 | Terai | 248/430 |
| 5,048,787 | 9/1991 | Saitoh | 248/430 |
| 5,048,886 | 9/1991 | Ito et al. | 296/65.1 |

FOREIGN PATENT DOCUMENTS 64-9043 1/1989 Japan .

Primary Examiner—Ramon O. Ramirez
Attorney, Agent, or Firm—Finnegan, Henderson, Farabow, Garrett & Dunner

[57] ABSTRACT

A sliding device for moving a seat in the lengthwise direction of a vehicle body is comprised of an upper rail having an inner space and supporting the seat, a lower rail having an inner space, secured to a floor of the vehicle floor and mounting the upper rail in such a manner that the upper and lower rails are inter-locked with each other, the upper rail is slidable along the lower rail and the inner space of the upper rail is positioned above the inter-locked portion, a screw shaft rotatably supported by the upper rail and located therein, a nut threadably mounted on the screw shaft and secured to the lower rail so as to be located in the inner space of the upper rail, and a motor for rotating the screw shaft.

4 Claims, 3 Drawing Sheets

VEHICLE SEAT SLIDING DEVICE

BACKGROUND OF THE INVENTION

The present invention relates to a sliding device for moving a seat in the lengthwise direction of a vehicle body, and in particular to a sliding device including a screw mechanism for moving a seat in the lengthwise direction of a vehicle body.

In a conventional sliding device for moving a seat in the lengthwise direction of a vehicle body which is disclosed in Japanese Patent Laid-open Print No. Sho64(1989)-9043 published in 1989 without examination, an upper rail for supporting a cushion with a recliner is mounted slidably on a lower rail which is secured to a floor of a vehicle body and is inter-locked with the lower rail. Within a space defined between the upper and the lower rails, a driving mechanism is accommodated which serves for moving the upper rail along the lower rail in the direction of the lengthwise one of the vehicle body. The driving mechanism includes a screw shaft which is so connected to the lower rail as to be rotatable and a nut threadably mounted on the screw shaft. The upper rail to which the nut is secured is set to be moved in the lengthwise direction of the vehicle body when a motor is turned on which is used for rotating the screw shaft.

However, in the foregoing structure, the screw shaft in the space on which the nut is treadably mounted is arranged in parallel with the inter-locked portion between the upper and the lower rails, which results in that the lower rail is compelled to be large in its width and a lower space defined between the cushion and the floor becomes narrow in the lateral direction of the vehicle body.

SUMMARY OF THE INVENTION

It is an object of the invention to provide a sliding device for moving a seat in the lengthwise direction of a vehicle body without the above conventional drawbacks.

It is another object of the invention to provide a sliding device for moving a seat in the lengthwise direction of a vehicle body in which a lower rail is small in its width and a lower space defined between a cushion and a floor becomes wide in the lateral direction of the vehicle body.

In order to attain the foregoing objects, a sliding device for moving a seat in the lengthwise direction of a vehicle body is comprised of an upper rail having an inner space and supporting the seat, a lower rail having an inner space, secured to a floor of the vehicle floor and mounting the upper rail in such a manner that the upper and lower rails are inter-locked with each other, the upper rail is slidable along the lower rail and the inner space of the upper rail is positioned above the inter-locked portion, a screw shaft rotatably supported by the upper rail and located therein, a nut threadably mounted on the screw shaft and secured to the lower rail so as to be located in the inner space of the upper rail, and a motor for rotating the screw shaft.

BRIEF DESCRIPTION OF THE DRAWINGS

The above and other objects, features and advantages of the present invention will be more apparent and more readily appreciated from the following detailed description of preferred exemplarily embodiments of the present invention, taken in connection with the accompanying drawings, in which.

DESCRIPTION OF THE PREFERRED EMBODIMENTS

Figure 1:
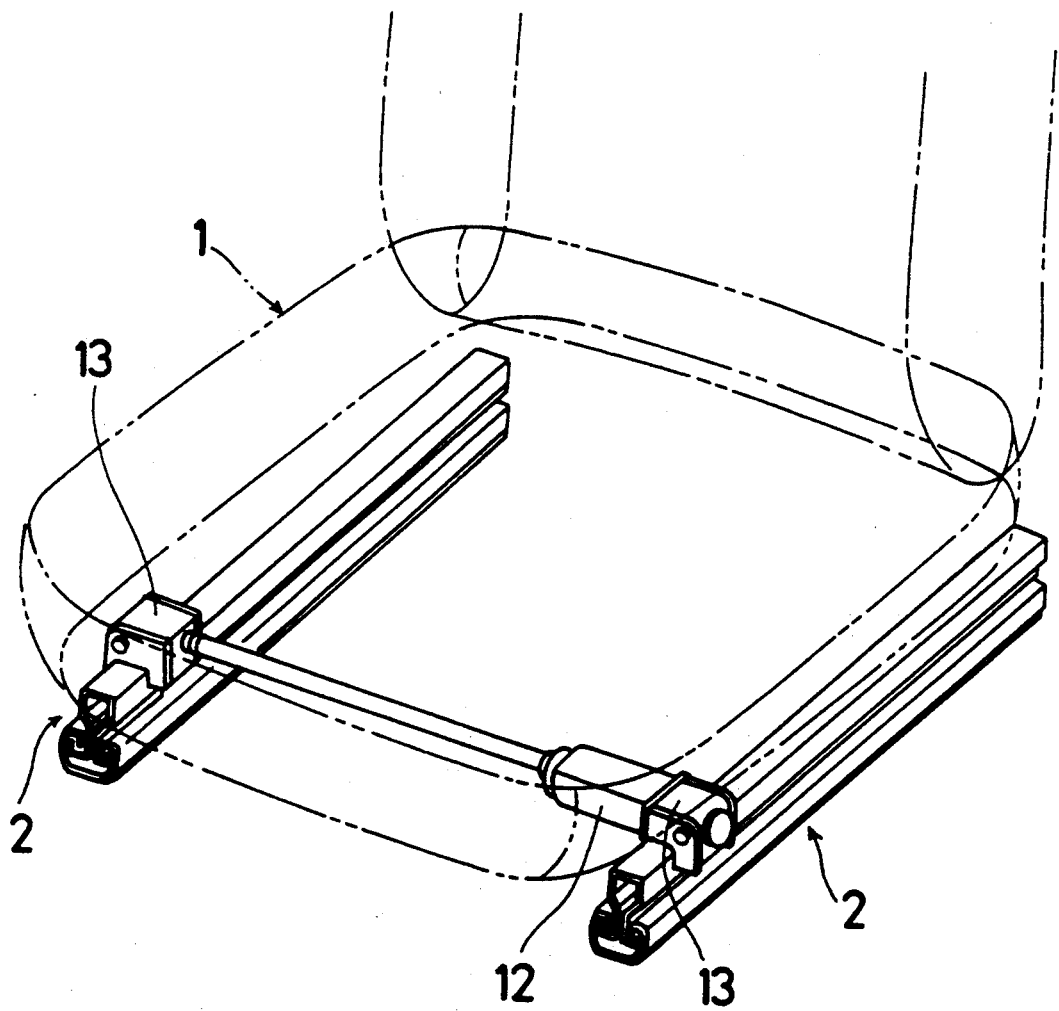
FIG. 1 is a perspective view of a sliding device for moving a seat in the lengthwise direction of a vehicle body according to the present invention.
Figure 2:
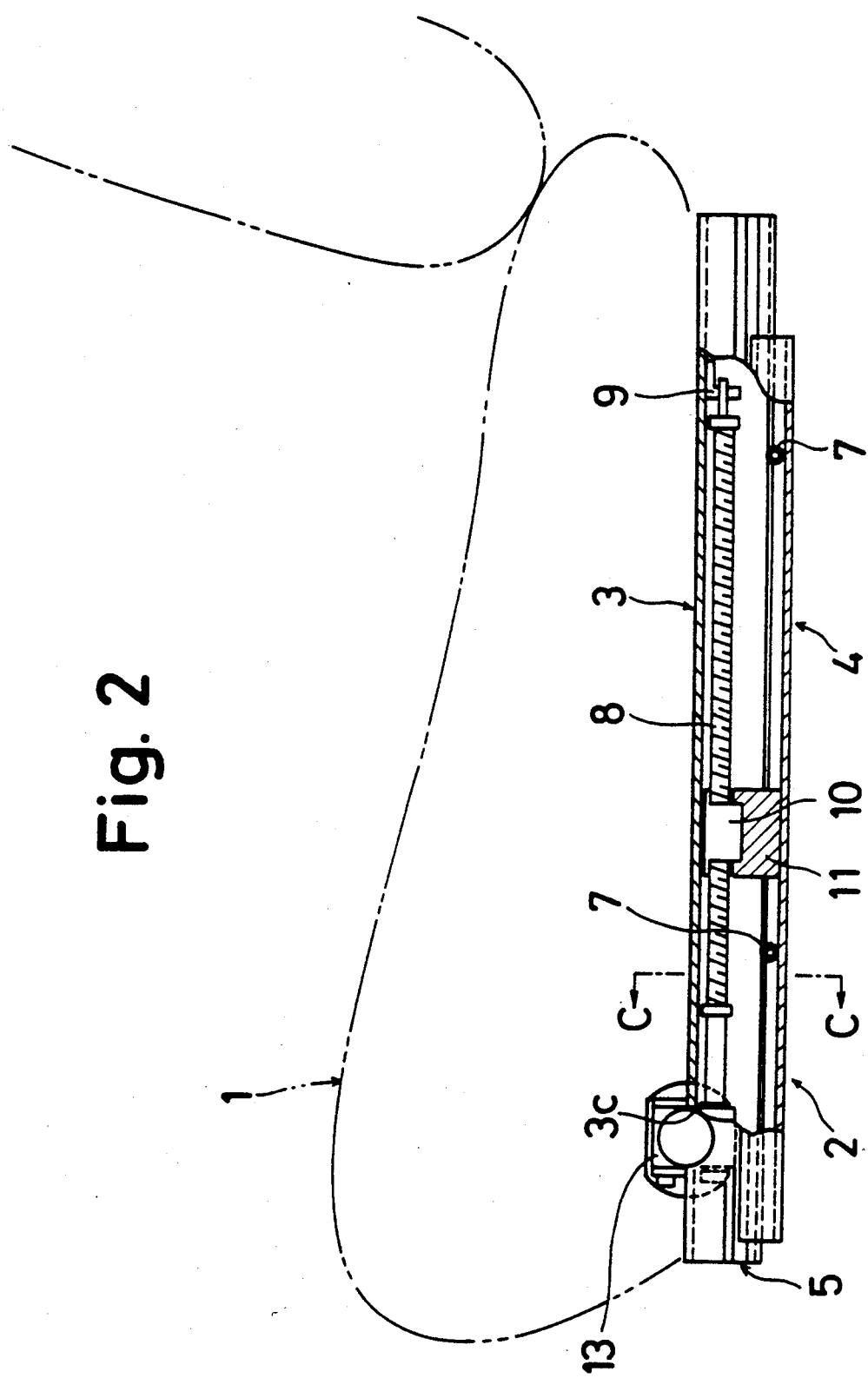
FIG. 2 is a partial cross-sectional view of a sliding device for moving a seat in the lengthwise direction of a vehicle body according to the present invention.
Figure 3:
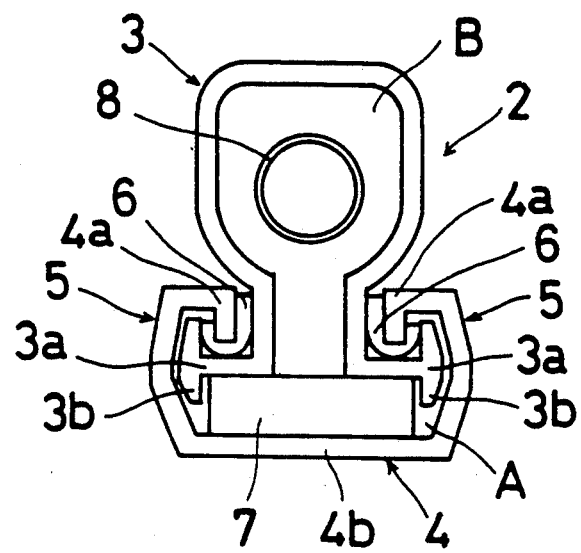
FIG. 3 is a cross-sectional view taken along line C—C in FIG. 2.

Referring to FIGS. 1 through 3, a sliding device 2 includes an upper rail 3 for supporting a cushion or seat 1 with a recliner and a lower rail 4 to be secured to a floor of a vehicle body (not indicated). In the sliding device 2, the upper rail 3 is mounted on the lower rail 4 and is so connected at a pair of inter-locked portions 5 and 5 to the lower rail 4 as to be slidable therealong. The lower rail 4 is extended in the lengthwise direction of the vehicle body.

The lower rail 4 has a substantially U-shaped configuration in its cross-section in which an inner space "A" is defined in such a manner that the inner space "A" is opened at its upper end. A pair of lateral distal ends of the lower rail 4 are bent into a pair of parallel spaced downward projections 4a. The upper rail 3 is formed into a substantially inverted U-shaped configuration having therein an inner space "B" which is opened at its lower end. A pair of distal ends 3a and 3a of the upper rail 3 are so bent as to be inter-locked with the corresponding projections 4a and 4a, respectively. In this structure, each end 3a of the upper rail 3 is within the inner space "A". A shoe 6 is so secured to each projection 4a of the lower rail 4 as to of the upper rail 3. Thus, the upper rail 3 is slidable along the lower rail 4. A pair of portions at which the ends 3a and 3a are inter-locked with the corresponding projections 4a and 4a of the lower rail 4 constitute inter-locked portions. A roller 7 is interposed between a set of the end 3a and the end 3a of the upper rail 3 and a bottom 4b of the lower rail 4 in order to assure the smooth sliding movement of the upper rail 3 relative to the lower rail 4. The roller 4 is limited by a pair of spaced projections 3b and 3b of the upper rail 3.

A lower portion of the upper rail 3 is formed into a configuration wherein a lower portion is narrower in the lateral direction than an upper portion in order that the lower portion may be inserted into the inner space "A" of the lower rail 4 through the upper opening thereof, and the inner space "B" of the upper rail 3 is positioned above the inter-locked portion 5.

Within the upper rail 3 a screw shaft 8 is, accommodated. The screw shaft 8 is rotatably supported by a pair of threadably spaced brackets which are secured to a lower portion of the seat 1. A nut 10 which is thredaby mounted on the screw shaft 8 is secured to the lower rail 4 via a holder 11. The nut 10 is operatively connected to a motor 12 via a gear mechanism which is arranged in a pair of gear boxes 13 and 13. Each box 13 is secured to the upper rail 3 at its notch 3c. The gear mechanism is used for reducing the rotational number of the motor 12 and changing its direction. The screw shaft 8, the nut 10 are accommodated within the inner space B of the upper rail 3.

In operation, when the motor 12 is turned on, the screw shaft 8 is rotated, resulting in the movement of the screw shaft 8 together with the upper rail 3 relative to the lower rail 4. Thus, an adjustment of the seat 1 in the lengthwise direction of the vehicle body is established.

As mentioned above, in the foregoing structure of the vehicle seat sliding device, the position of the screw shaft 8 is higher than the position of each inter-locked portion, which means that the lateral width of the lower rail 3 per se becomes a narrower in comparison with the conventional one. Thus, the space defined between the seat and the floor of the vehicle body can be of sufficient width. The foregoing structure becomes high in comparison with the conventional one, which results in the strong connection between the upper and lower rails 3 and 4 in the vertical direction.

Figure 4:
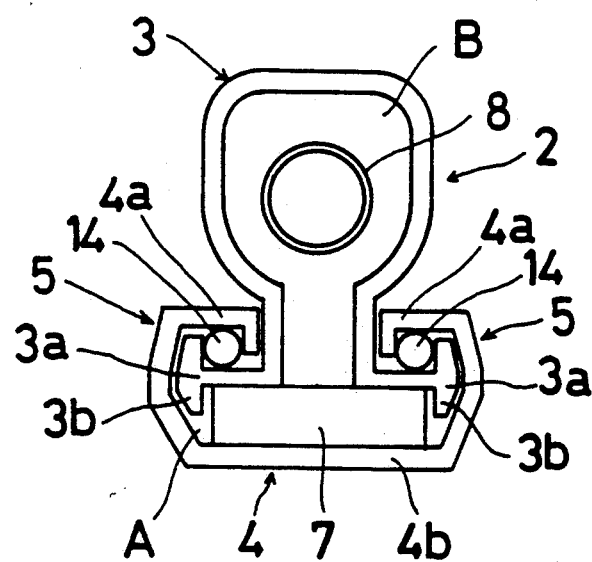
FIG. 4 is a cross-sectional view of another embodiment of the present invention which corresponds to FIG. 3.

As shown in FIG. 4, instead of the shoe 6, a ball 14 is available. The remaining portions of this structure are so similar to those of the structure shown in FIG. 3 that the explanation relating to the remaining portions is omitted.

It is also to be noted that the screw shaft 8 and the nut 10 can be secured to the lower rail 4 and the upper rail 3, respectively, contrary to the foregoing structure.

Obviously, many modifications and variations of the present invention are possible in light of the above teachings. It is, therefore, to be understood that within the scope of the appended claims, the invention may be practiced otherwise than as specifically described.

What is claimed is:

1. A sliding device for moving a seat in the lengthwise direction of a vehicle body comprising:

an upper rail for supporting the seat and having downwardly depending first side portions spaced a first distance apart, narrowing to a neck portion having downwardly depending second side portions spaced a second distance apart which is less than said first distance, said second side portions ending in first distal end portions, said first side portions and said neck portion defining a first space;

a lower rail to be secured to a floor of the vehicle body, said lower rail including upwardly projecting side portions ending in second distal ends, said neck portion of said upper rail extending between said second distal ends, said first distal ends being interlocked with said second distal ends at an interlocked portion for slidable movement of said upper rail with respect to said lower rail, a second space being defined between said side portions of said lower rail and said interlocked portion, with said first space positioned above said interlocked portion;

a screw shaft rotatably supported by the upper rail and located within said first space;

a nut threadably mounted on the screw shaft in said first space, and including connecting means for connecting said nut to the lower rail; and a motor for rotating the screw shaft.

2. A sliding device for moving a seat in the lengthwise direction of a vehicle body according to claim 1, wherein a shoe is interposed between the lower rail and the upper rail at the inter-locked portion.

3. A sliding device for moving a seat in the lengthwise direction of a vehicle body according to claim 1, wherein a ball is interposed between the lower rail and the upper rail at the inter-locked portion.

4. A sliding device for moving a seat in the lengthwise direction of a vehicle body according to claim 1, wherein the connecting means comprises a holder interposed between the nut and the lower rail.

* * * * *